United States Patent
Park et al.

(10) Patent No.: US 10,007,631 B2
(45) Date of Patent: Jun. 26, 2018

(54) DISPLAY DEVICE

(71) Applicant: SAMSUNG DISPLAY CO., LTD., Yongin-si, Gyeonggi-do (KR)

(72) Inventors: Min Young Park, Yongin-si (KR); Ki Hyun Pyun, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 133 days.

(21) Appl. No.: 15/093,489

(22) Filed: Apr. 7, 2016

(65) Prior Publication Data

US 2016/0321208 A1  Nov. 3, 2016

(30) Foreign Application Priority Data

Apr. 28, 2015  (KR) .................. 10-2015-0059910

(51) Int. Cl.
*G06F 13/20* (2006.01)
*G06F 13/00* (2006.01)
*G06F 13/40* (2006.01)
*G06F 13/42* (2006.01)
*G06F 12/02* (2006.01)

(52) U.S. Cl.
CPC ...... *G06F 13/4022* (2013.01); *G06F 12/0246* (2013.01); *G06F 13/4282* (2013.01); *G06F 2212/7206* (2013.01)

(58) Field of Classification Search
None
See application file for complete search history.

(56) References Cited

U.S. PATENT DOCUMENTS

| | | | |
|---|---|---|---|
| 8,432,347 B2 | 4/2013 | Hiraki et al. | |
| 9,860,460 B2* | 1/2018 | Kim | H04N 5/3532 |
| 2009/0322795 A1* | 12/2009 | Vasquez | G09G 3/3413 345/690 |
| 2011/0264846 A1* | 10/2011 | Oh | G11C 7/1051 711/103 |
| 2013/0155036 A1* | 6/2013 | Kim | G09G 3/2092 345/204 |
| 2014/0160106 A1* | 6/2014 | Choi | G09G 5/363 345/212 |
| 2014/0203879 A1* | 7/2014 | Kim | H03L 1/022 331/66 |
| 2014/0378958 A1 | 12/2014 | Leussler | |

FOREIGN PATENT DOCUMENTS

| | | |
|---|---|---|
| JP | 2004-86146 A | 3/2004 |
| KR | 10-2004-0068730 A | 8/2004 |

* cited by examiner

*Primary Examiner* — Michael Sun
(74) *Attorney, Agent, or Firm* — Lewis Roca Rothgerber Christie LLP

(57) ABSTRACT

There is provided a display device including an input unit configured to connect an external device to a serial peripheral interface (SPI) through a plurality of connection lines, a switching unit configured to connect the input unit and a flash memory of a driving board to the SPI, a data register configured to output connection setting data for determining a connection state of the switching unit, and a timing controller configured to output a control signal for determining the connection setting data according to an input of a write enable line among the plurality of connection lines.

9 Claims, 5 Drawing Sheets

DISPLAY DEVICE

CROSS-REFERENCE TO RELATED APPLICATION

This application claims priority to and the benefit of Korean Patent Application No. 10-2015-0059910, filed on Apr. 28, 2015, in the Korean Intellectual Property Office, the entire content of which is incorporated herein by reference in its entirety.

BACKGROUND

1. Field

Aspects of the present invention relate to a display device.

2. Description of the Related Art

Recently, there have been developed various types of flat panel display devices capable of reducing the weight and volume of comparable cathode ray tubes. The flat panel display devices include liquid crystal displays, field emission displays, plasma display panels, organic light emitting displays, and the like.

Liquid crystal displays are used in almost all information processing devices that operate in tandem with display devices, including small-sized products such as a cellular phone, a personal digital assistant (PDA), and a portable multimedia player (PMP), or middle- and large-sized products such as a monitor and a TV.

A display device generally includes a display panel, a source circuit, and a control circuit. The source circuit may include a flash memory for storing an unevenness correction value of each pixel included in the display panel. A timing controller of the control circuit controls the connection between an external device and the source circuit such that the external device can input the unevenness correction value of each pixel.

Meanwhile, a communication interface between the timing controller of the control circuit and the flash memory of the source circuit is made in a serial peripheral interface (SPI) communication scheme. In this case, when a read or write operation is performed in communication between the timing controller, the flash memory, and the external device, a stub line in a partial connection section may serve as capacitance. Hence, the attenuation of a clock signal occurs, and reflection occurs at an end of the stub line. Therefore, distortion of the clock signal may also occur.

SUMMARY

Embodiments provide a method and a structure for connecting a control circuit and a source circuit of a display device to each other.

According to an aspect of the present invention, there is provided a display device including: an input unit configured to connect an external device to a serial peripheral interface (SPI) through a plurality of connection lines; a switching unit configured to connect the input unit and a flash memory of a driving board to the SPI; a data register configured to output connection setting data for determining a connection state of the switching unit; and a timing controller configured to output a control signal for determining the connection setting data according to an input of a write enable (write EN) line among the plurality of connection lines.

In an embodiment, the display device further includes a converter configured to generate connection setting data through an inter-integrated circuit (I2C) interface by receiving the control signal from the timing controller.

In an embodiment, the switching unit includes: a first switch circuit configured to selectively connect the timing controller and the flash memory to each other; and a second switch circuit configured to selectively connect the flash memory and the input unit to each other.

In an embodiment, when the input of the write EN line is at a logic high, the first switch circuit is activated, and the second switch circuit is deactivated.

In an embodiment, when the input of the write EN line is at a logic low, the second switch circuit is activated, and the first switch circuit is deactivated.

In an embodiment, when the input of the write EN line is at a logic high, the connection setting data includes data for connecting the first switch circuit.

In an embodiment, the input of the write EN line is at a logic low, the connection setting data includes data for connecting the second switch circuit.

In an embodiment, the flash memory is configured to store unevenness correction data of each of a plurality of pixels of the display device.

According to an aspect of the present invention, there is provided a method for connecting a control circuit and source circuit of a display device to each other, the method including: connecting, by an input unit, an external device to a serial peripheral interface (SPI) through a plurality of connection lines; connecting, by a switching unit, the input unit and a flash memory of a driving board to the SPI; outputting, by a data register, connection setting data for determining a connection state of the switching unit; and outputting, by a timing controller, a control signal for determining the connection setting data according to an input of a write enable (write EN) line among the plurality of connection lines.

According to an aspect of the present invention, there is provided a system for connecting a control circuit and source circuit of a display device to each other, the system including means for: connecting an external device to a serial peripheral interface (SPI) through a plurality of connection lines; connecting the input unit and a flash memory of a driving board to the SPI; outputting connection setting data for determining a connection state of the switching unit; and outputting a control signal for determining the connection setting data according to an input of a write enable (write EN) line among the plurality of connection lines.

According to embodiments of the present invention, when a read or write operation is performed between a control circuit and a source circuit, stub lines are removed, so that it is possible to prevent attenuation or distortion of a clock signal.

Further, stub lines can be removed not only when an unevenness correction value of each pixel is renewed but also when communication between an external device and the source circuit is performed.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawings, dimensions may be exaggerated for clarity of illustration. Like reference numerals refer to like elements throughout.

DETAILED DESCRIPTION

Figure 1:
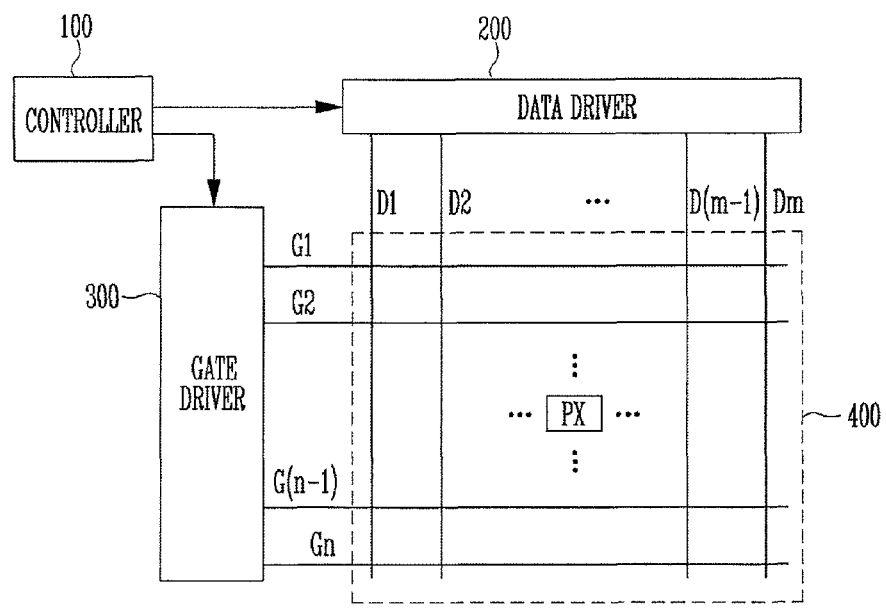
FIG. 1 is a plan view a display device according to an embodiment of the present invention.

Hereinafter, exemplary embodiments of the present invention will be described in more detail with reference to the accompanying drawings.

In describing those embodiments, description will be omitted for techniques that are well known to the art to which the present invention pertains, and that are not directly related to the present invention. This intends to disclose the gist of the present invention more clearly by omitting unnecessary description.

Aspects and features of the present invention and methods of accomplishing the same may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will be defined by the appended claims. Like reference numerals refer to like elements throughout the specification.

FIG. 1 is a plan view a display device according to an embodiment of the present invention.

Referring to FIG. 1, the display device according to the embodiment of the present invention includes a controller 100, a data driver 200, a gate driver 300, and a display panel 400.

The controller 100 controls overall operations of the display device. The controller 100 may include a timing controller, which transmits control signals to the data driver 200 and the gate driver 300. In various embodiments, the controller 100 may include a control circuit or control board including the timing controller. The controller 100 may receive input image data (RGB) or input control signals from an external device. For example, the input image data may include red image data, green image data, and blue image data. The input control signals may include a master clock signal and a data enable signal. The input control signals may further include a vertical synchronization signal and a horizontal synchronization signal.

The controller 100 may output input image data to the data driver 200. The data driver 200 may receive the input image data and sequentially or concurrently (e.g., simultaneously) output the received input image data to the display panel 400 through data lines D1 to Dm. In this case, the data driver 200 may generate a data signal by compensating a grayscale of the input image data and output the generated data signal to the data lines D1 to Dm.

The data driver 200 may be integrated on a driving board. In various embodiments, the driving board may be a source circuit or source board. The driving board may include the data driver and a flash memory. The flash memory may store unevenness correction data of a plurality of pixels included in the display panel.

The controller 100 may output, to the gate driver 300, a signal for controlling the gate driver 300. The gate driver 300 may generate a driving signal for driving gate lines G1 to Gn and sequentially output the generated driving signal to the gate lines G1 to Gn.

The display panel 400 may include a plurality of gate lines G1 to Gn, a plurality of data lines D1 to Dm, and a plurality of pixels PX electrically connected respectively to the gate lines G1 to Gn and the data lines D1 to Dm.

Figure 2:
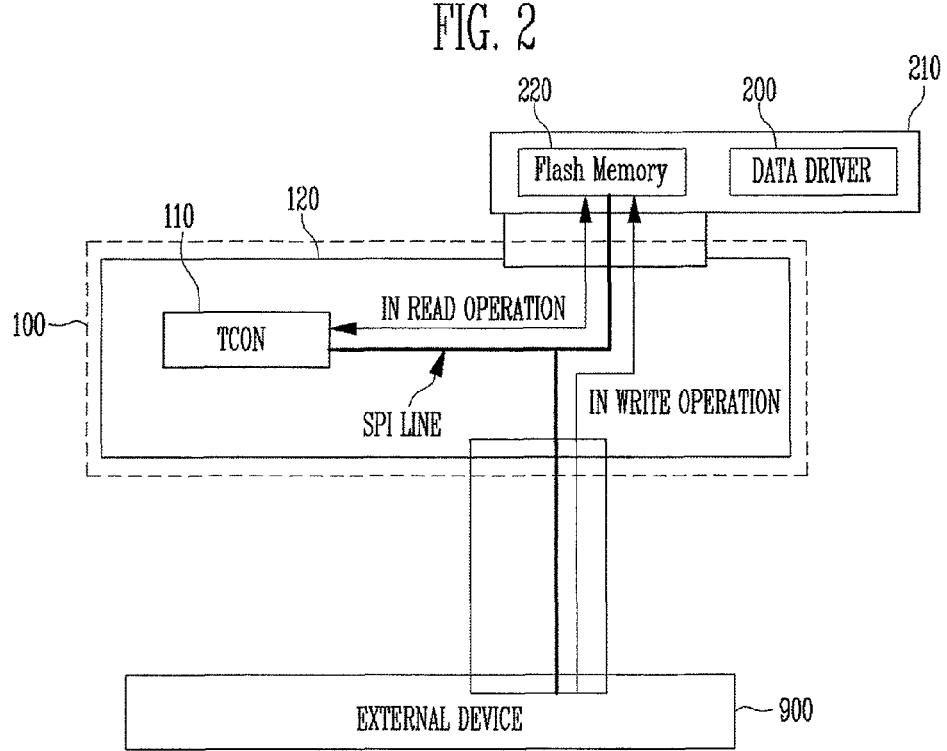
FIG. 2 is a view illustrating a connection scheme of a timing controller, a source circuit, and an external device according to a related art.

FIG. 2 is a view illustrating a connection scheme of a timing controller, a source circuit, and an external device according to a related art.

In FIGS. 2 to 5, it is assumed that a read or write operation is performed on an unevenness correction value of each pixel so as to describe connection among an external device 900, a flash memory 220 of a driving board 210, and a timing controller 110 of a control board 120. However, the present invention is not limited thereto, and may be applied to all cases where the connection among the external device 900, the flash memory 220 of the driving board 210, and the timing controller 110 of the control board 120 is desired.

Here, the external device 900 may be a set board for setting an operation of a display device or a writer for inputting data.

A controller 100 may include the timing controller 110 and the control board 120 including the timing controller 110.

The driving board 210 may include the flash memory 220 and a data driver 200.

According to FIG. 2, when a read operation is performed, serial peripheral interface (SPI) communication between the timing controller 110 and the flash memory 220 of the driving board 210 is performed.

On the other hand, when a write operation is performed, SPI communication between the external device 900 and the flash memory 220 is performed.

Figure 3:
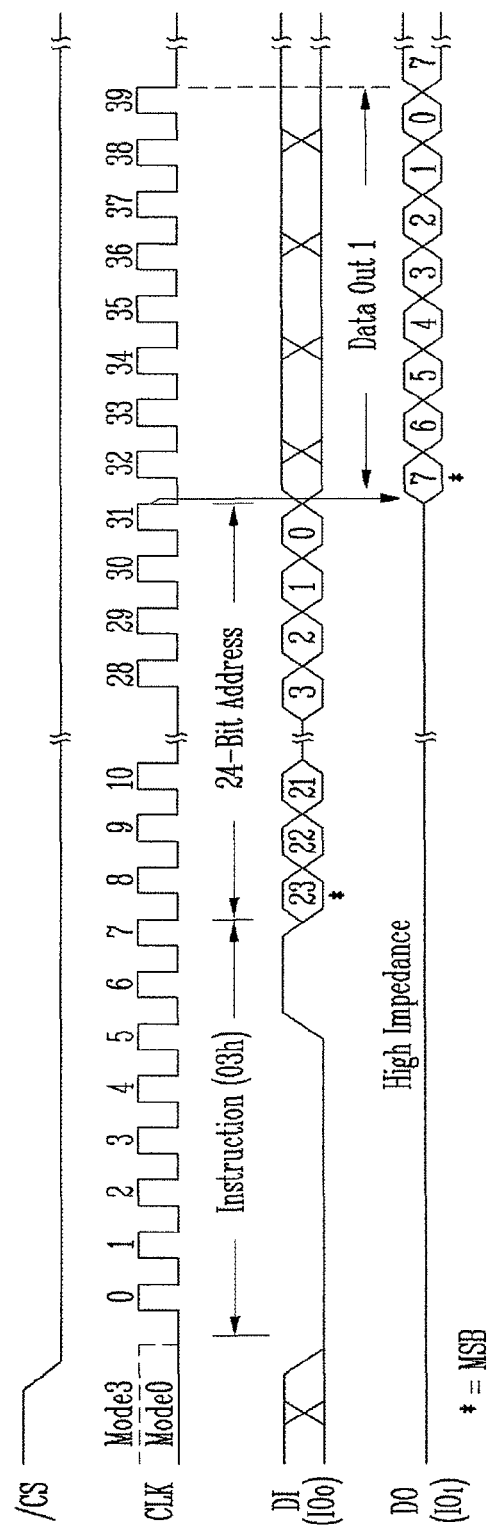
FIG. 3 is a view illustrating a serial peripheral interface (SPI) communication scheme between a timing controller and a peripheral circuit.

FIG. 3 is a view illustrating an SPI communication scheme between a timing controller and a peripheral circuit.

The SPI communication scheme is a serial communication device or serial communication scheme for communication between a processor and a peripheral integrated circuit (IC). In the SPI communication scheme, SPI communication is performed through three lines, that is, a serial clock (SCLK) line, a slave in (SI) line, and a slave out (SO) line.

The SPI communication supports communication between one master and a plurality of slaves. In this case, when the number of slaves is a plural number, a chip selection (CS) line for selecting a corresponding slave may be further provided. When a corresponding signal is output at a logic low level from the CS line to an active lower pin in the timing controller, the SPI communication is started. When the level of the signal output from the CS line is at a logic high, the SPI communication is completed.

An SCLK is used to notify a timing for data transmission from the master to the slaves. The SCLK is a signal output together with the signal output from the CS line through an oscillator inside the timing controller when the level of the signal output from the CS line is at a logic low. Data is recognized according to rising edges of the SCLK.

A data in (DI) line may also be designated as the SI line. The DI line may be a line through which data between the master and the slaves are transmitted. The SI line may be normally a line through which data output from the master and then input to the slaves are transmitted. However, data may be transmitted in both directions of the SI line when desired. For example, an instruction for a reading scheme and a flash address of a flash memory are output from the timing controller through the SI line, and data stored in the flash memory may be input to the controller through the SI line.

A data out (DO) line may also be designated as the SO line. The DO line may be a line through which data output from the slaves and then input to the master are transmitted. For example, in the present invention, the SO line may be a line through which data stored in the flash memory is input to the timing controller.

Figure 4:
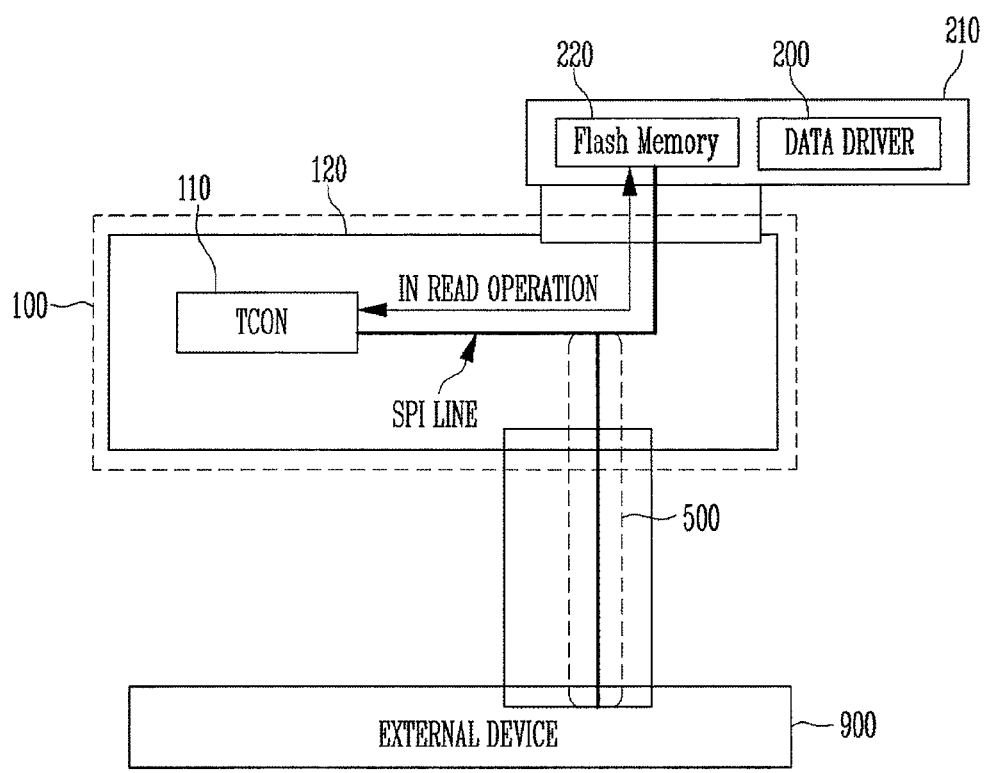
FIG. 4 is a view illustrating a problem that occurs when a read operation is performed in the connection scheme of the timing controller, the source circuit, and the external device according to the related art.

FIG. 4 is a view illustrating a problem that occurs when a read operation is performed in the connection scheme of the timing controller, the source circuit, and the external device according to the related art.

According to FIG. 4, in the connection among the timing controller 110, the flash memory 220 of the driving board 210, and the external device 900 according to the related art, when a read operation is performed, communication between the timing controller 110 and the flash memory 220 is performed. In the read operation, a line 500 connected to the external device 900 may serve as a stub line in a point of view of the timing controller 110 and the flash memory 220 between which communication is performed.

Figure 5:
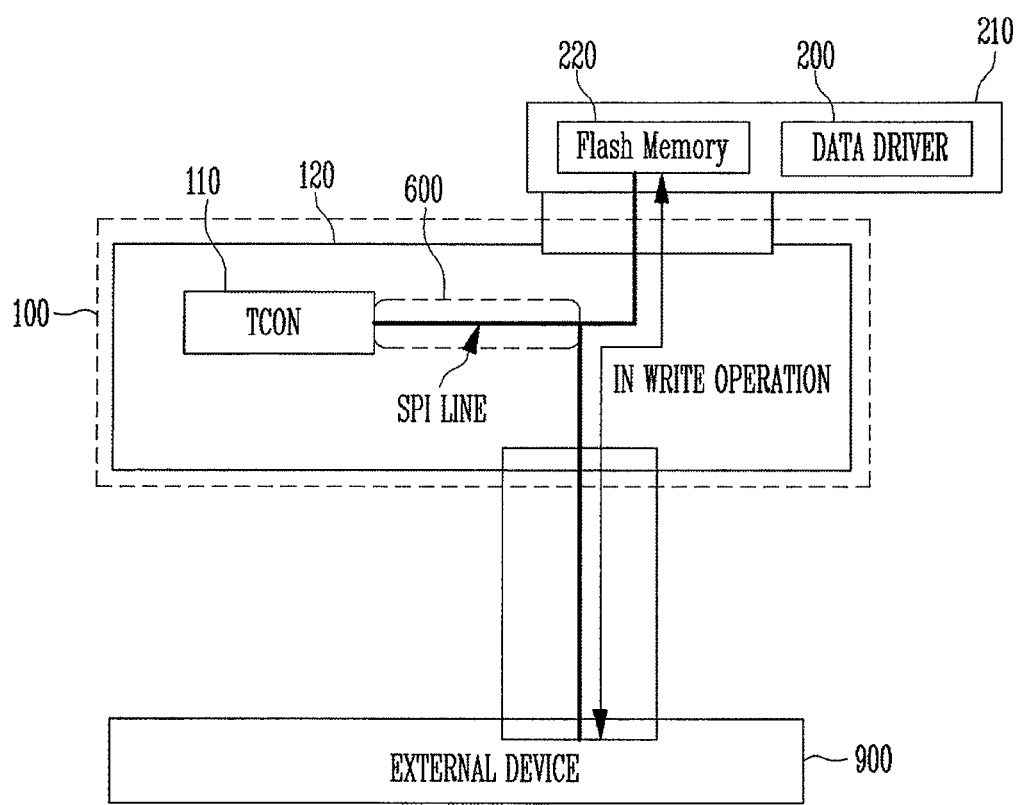
FIG. 5 is a view illustrating a problem that occurs when a write operation is performed in the connection scheme of the timing controller, the source circuit, and the external device according to the related art.

FIG. 5 is a view illustrating a problem that occurs when a write operation is performed in the connection scheme of the timing controller, the source circuit, and the external device according to the related art.

According to FIG. 5, in the connection among the timing controller 110, the flash memory 220 of the driving board 210, and the external device 900 according to the related art, when a write operation is performed, communication between the external device 900 and the flash memory 220 is performed. In the write operation, a line 600 connected to the timing controller 110 may serve as a stub line in a point of view of the external device (e.g., set board or writer) and the flash memory 220 between which communication is performed.

As described in FIGS. 4 and 5, when the read or write operation is performed, the stub line may serve as capacitance. Hence, the attenuation of a clock signal occurs, and reflection occurs at an end of the stub line. Therefore, the distortion of the clock signal may also occur.

When attenuation or distortion occurs in a reference clock when the external device (e.g., set board or writer) records unevenness correction data of pixels in the flash memory 220, or when the timing controller 110 reads the unevenness correction data of the pixels, stored in the flash memory 220, an accurate unevenness correction cannot be performed, which may adversely influence the quality of the display device.

In an embodiment of the present invention, a system/method is provided to connect an external device, a flash memory of a driving board, and a control circuit to one another so as to remove stub lines.

Figure 6:
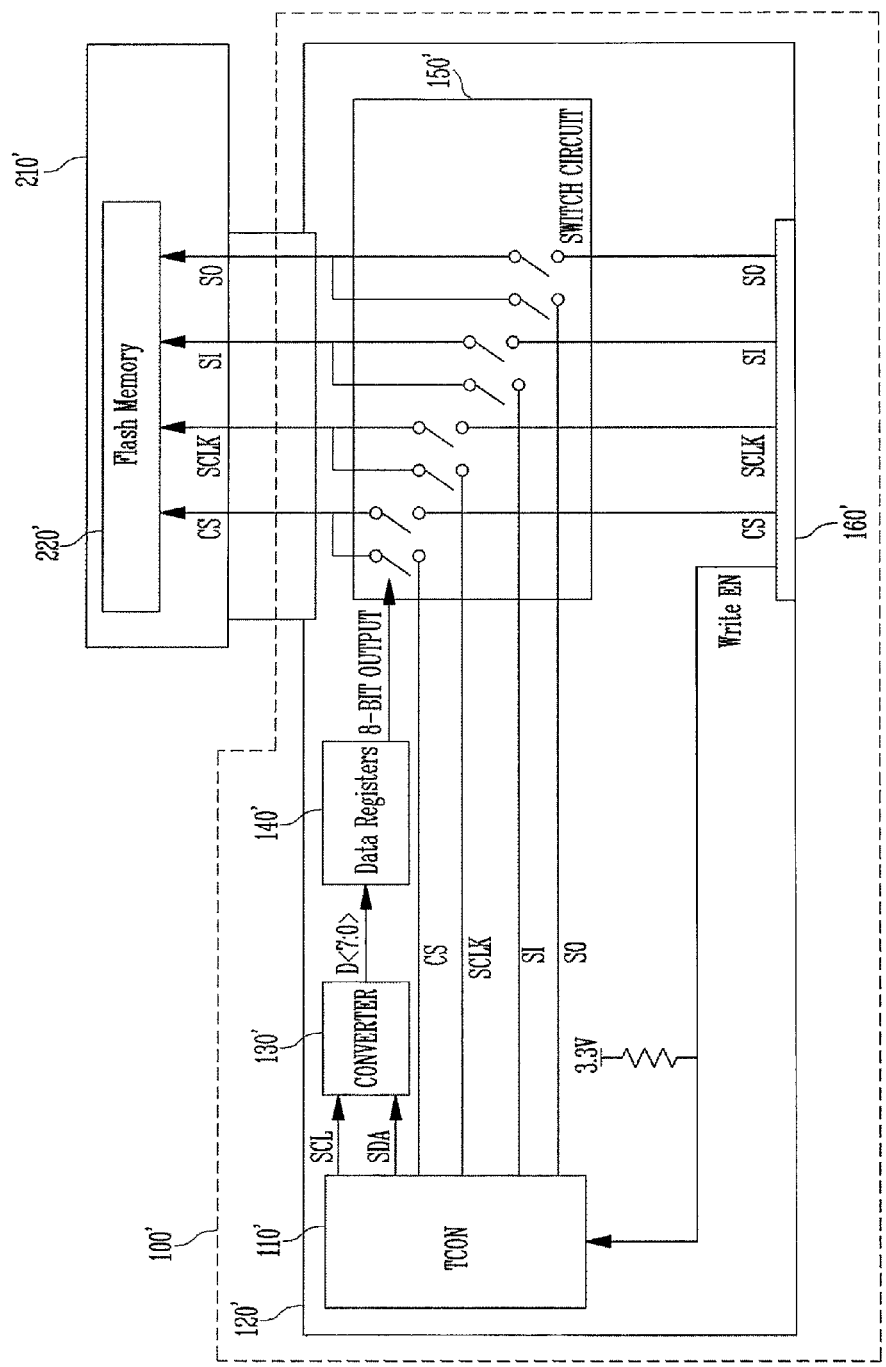
FIG. 6 is a view illustrating a control circuit of a display device according to an embodiment of the present invention.

FIG. 6 is a view illustrating a control circuit of a display device according to an embodiment of the present invention.

According to FIG. 6, the control board 120' according to the embodiment of the present invention may include a timing controller 110', an input unit 160', a converter 130', a data register 140', and a switching unit 150'.

The timing controller 110' may communicate with an external device connected to the input unit 160' and a flash memory 220' in the SPI communication scheme. For example, the timing controller 110' may communicate with the flash memory 220' through the switching unit 150' or control the external device to communicate with the flash memory 220'.

The external device may be connected to the input unit 160'. According to the embodiment of the present invention, the input unit 160' may further include a write enable (write EN) line in addition to the SCLK line, the SI line, the SO line, and the CS line, which are used in the SPI communication scheme.

A signal based on whether or not a write operation is performed may be transmitted to the timing controller 110' through the write EN line.

The converter 130' may receive a clock and data of the timing controller 110' and may convert the received clock and data into an 8-bit data string. In various embodiments, the converter 130' may allow connection setting data to be stored in the data register 140' through an inter-integrated circuit (I2C) interface. The connection setting data may, for example, be "10101010" when the write operation is enable. The connection setting data may, for example, be "01010101" when the write operation is disable.

The data register 140' may output, to the switching unit 150', the 8-bit data string stored by the converter 130'.

The switching unit 150' controls a switch circuit included therein according to an output value of the data register 140'. A control method of the switch circuit will be described in more detail later. The switch circuit may include a first switch circuit for connecting the timing controller 110' and the flash memory 220' to each other and a second switch circuit for connecting the flash memory 220' and the input unit 160' connected to the external device. The switching unit 150' may connect any one of the first and second switch circuits and release the connection of the other of the first and second switch circuits.

When the level of a signal input to the write EN line is at a logic high (SPI read operation), the timing controller 110' allows, for example, "10101010" to be stored in the data register 140' through the I2C interface. The data register 140' may output the stored data such that switches assigned to "1" are activated (e.g., connected or turned ON) and switches assigned to "0" are deactivated (e.g., disconnected or turned OFF).

That is, lines between the timing controller 110' and the flash memory 220' are connected, and lines connected to the external device (e.g., set board or writer) connected to the input unit 160' are not connected. Thus, any stub line is not formed.

Next, when the level of a signal input to the write EN line is at a logic low (SPI write operation), the timing controller 110' allows, for example, "01010101" to be stored in the data register 140' through the I2C interface. The data register 140' may output the stored data such that the switches assigned to "1" are activated (e.g., connected or turned ON) and the switches assigned to "0" are deactivated (e.g., disconnected or turned OFF).

That is, lines between the external device (e.g., set board or writer) connected to the input unit 160' and the flash memory 220' are connected, and lines connected to the timing controller 110' are not connected. Thus, any stub line is not formed.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. When an element or layer is referred to as being "directly on," "directly connected to", "directly coupled to", or "immediately adjacent to" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

The display device and/or any other relevant devices or components according to embodiments of the present invention described herein may be implemented utilizing any suitable hardware, firmware (e.g. an application-specific integrated circuit), software, or a suitable combination of software, firmware, and hardware. For example, the various components of the display device may be formed on one integrated circuit (IC) chip or on separate IC chips. Further, the various components of the display device may be implemented on a flexible printed circuit film, a tape carrier package (TCP), a printed circuit board (PCB), or formed on a same substrate. Further, the various components of the display device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims, and equivalents thereof.

What is claimed is:

1. A display device comprising:
   an input unit configured to connect an external device to a serial peripheral interface (SPI) through a plurality of connection lines;
   a switching unit configured to connect the input unit and a flash memory of a driving board to the SPI;
   a data register configured to output connection setting data for determining a connection state of the switching unit; and
   a timing controller configured to output a control signal for determining the connection setting data according to an input of a write enable (write EN) line among the plurality of connection lines,
   wherein the flash memory is configured to store unevenness correction data of each of a plurality of pixels of the display device.

2. The display device of claim 1, further comprising a converter configured to generate connection setting data through an inter-integrated circuit (I2C) interface by receiving the control signal from the timing controller.

3. The display device of claim 1, wherein the switching unit comprises:
   a first switch circuit configured to selectively connect the timing controller and the flash memory to each other; and
   a second switch circuit configured to selectively connect the flash memory and the input unit to each other.

4. The display device of claim 3, wherein, when the input of the write EN line is at a logic high, the first switch circuit is activated, and the second switch circuit is deactivated.

5. The display device of claim 3, wherein, when the input of the write EN line is at a logic low, the second switch circuit is activated, and the first switch circuit is deactivated.

6. The display device of claim 3, wherein, when the input of the write EN line is at a logic high, the connection setting data comprises data for connecting the first switch circuit.

7. The display device of claim 3, wherein, when the input of the write EN line is at a logic low, the connection setting data comprises data for connecting the second switch circuit.

8. A method for connecting a control circuit and source circuit of a display device to each other, the method comprising:
  connecting, by an input unit, an external device to a serial peripheral interface (SPI) through a plurality of connection lines;
  connecting, by a switching unit, the input unit and a flash memory of a driving board to the SPI;
  outputting, by a data register, connection setting data for determining a connection state of the switching unit; and
  outputting, by a timing controller, a control signal for determining the connection setting data according to an input of a write enable (write EN) line among the plurality of connection lines,
  wherein the flash memory is configured to store unevenness correction data of each of a plurality of pixels of the display device.

9. A system for connecting a control circuit and source circuit of a display device to each other, the system comprising means for:
  connecting an external device to a serial peripheral interface (SPI) through a plurality of connection lines;
  connecting an input unit and a flash memory of a driving board to the SPI through a switching unit;
  outputting connection setting data for determining a connection state of the switching unit; and
  outputting a control signal for determining the connection setting data according to an input of a write enable (write EN) line among the plurality of connection lines,
  wherein the flash memory is configured to store unevenness correction data of each of a plurality of pixels of the display device.

* * * * *